W. S. THOMAS.
BRAKE SHOE.
APPLICATION FILED DEC. 27, 1910.
1,004,218.
Patented Sept. 26, 1911.
2 SHEETS—SHEET 1.
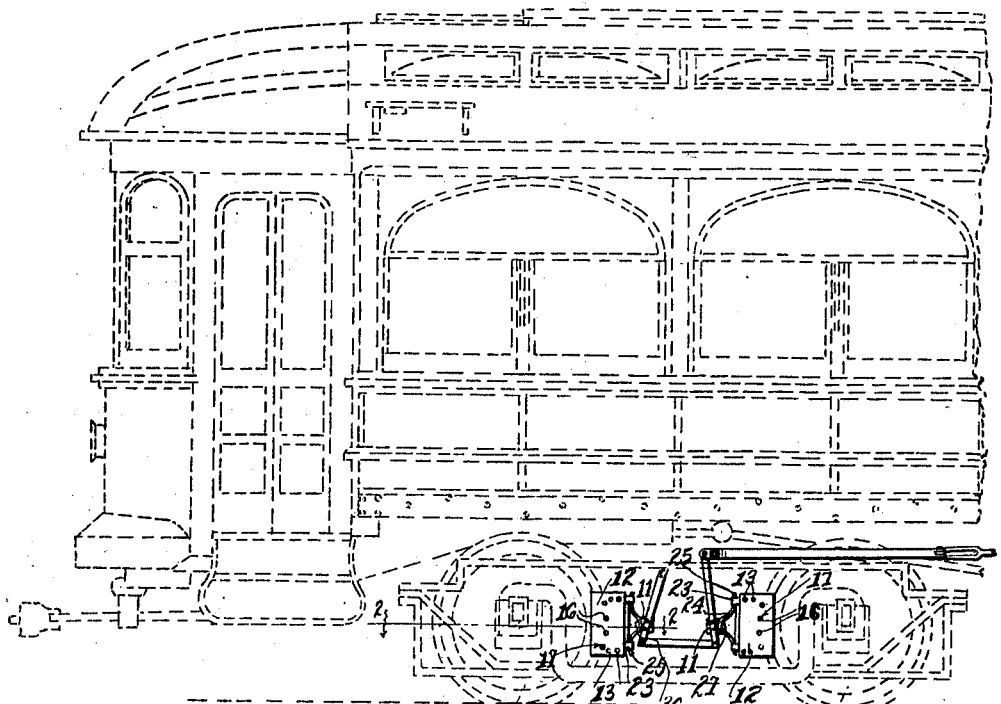
Fig. 1.
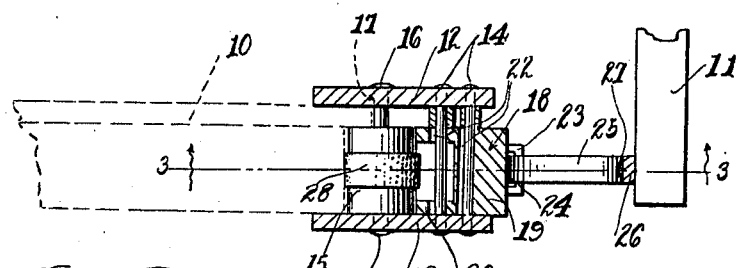
Fig. 2.
Witnesses
M. C. Fielding
Francis Boyle
Inventor
William S. Thomas.
By 
Attorneys
COLUMBIA PLANOGRAPH CO., WASHINGTON, D. C.

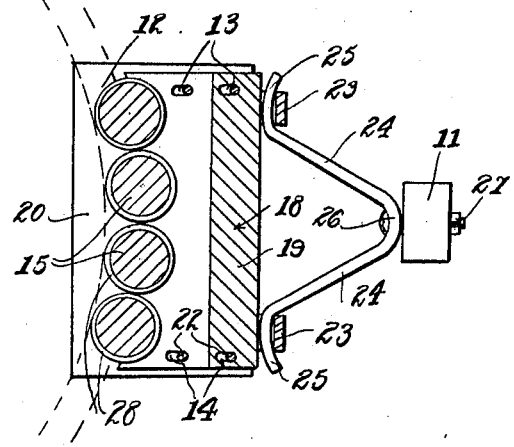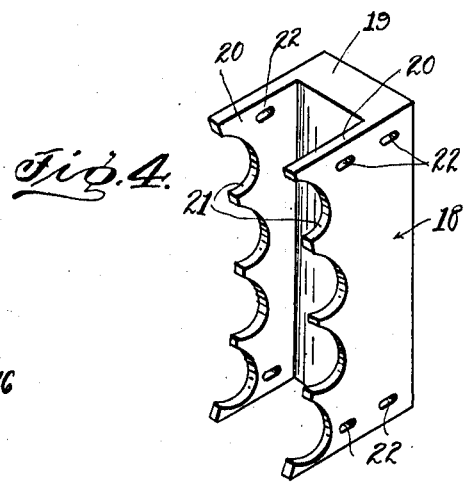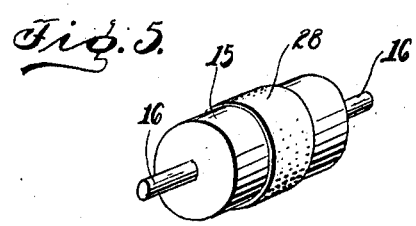

UNITED STATES PATENT OFFICE.

WILLIAM S. THOMAS, OF RENOVO, PENNSYLVANIA.

BRAKE-SHOE.

1,004,218.  Specification of Letters Patent.  Patented Sept. 26, 1911.

Application filed December 27, 1910. Serial No. 599,286.

*To all whom it may concern:*

Be it known that I, WILLIAM S. THOMAS, a citizen of the United States, residing at Renovo, in the county of Clinton, State of Pennsylvania, have invented certain new and useful Improvements in Brake-Shoes; and I do hereby declare the following to be a full, clear, and exact description of the invention, such as will enable others skilled in the art to which it appertains to make and use the same.

This invention relates to brake shoes and has for an object to provide a simple and durable shoe that will not be worn, or wear the vehicle wheel tread as much as ordinary brake shoes.

A further object of the invention is to provide a flexible brake shoe that will yield and minimize the shock transmitted to the brake beam when the brake shoe is set and the vehicle is passing over obstructions.

A still further object of the invention is to provide a yielding friction block that will engage the end portions of the friction rollers in applying the brake shoe, and will relieve the gudgeons of the rollers of strain.

With the above objects in view the invention resides in the novel form of friction block slidingly fitted between side plates which carry the friction rollers, and more generally consists in the novel details of construction and combination of parts hereinafter fully described and claimed.

In the accompanying drawing forming part of this specification, Figure 1 is a side elevation of a fragmentary portion of a railway coach with my improved brake shoe applied thereto, Fig. 2 is a cross sectional view taken on the line 2—2 Fig. 1, Fig. 3 is a longitudinal sectional view taken on the line 3—3 Fig. 2, Fig. 4 is a detail perspective view of the friction block, Fig. 5 is a detail perspective view of one of the friction rollers.

Although the brake shoe is herein illustrated in connection with a railway coach, it is intended for application to automobiles, carriages and other vehicles also, and now referring to the drawing wherein the car wheel is designated by the numeral 10, and the brake beam by the numeral 11, it will be seen that the invention comprises a pair of spaced approximately rectangular plates 12, these plates being arranged to extend along the side faces of the wheel and being spaced apart by a pair of transverse bolts 13 arranged adjacent to their upper edges and a similar pair of transverse bolts 14 arranged adjacent to their lower edges, these bolts all being fixedly secured to the plates in any preferred manner. Arranged between the plates adjacent their forward edges are a plurality of superposed rollers 15, these rollers being designed to bear against the tread of the wheel, and being mounted for rotation between the plates in any preferred manner, the method here shown consisting in forming on the opposite end faces of each roller an axial gudgeon 16 which fits in a suitable opening 17 in the adjacent side plate 12. The rollers it will be understood may be formed hollow and each be fitted with an axial shaft without departing from the spirit of the invention. These rollers are forced into frictional contact with the wheel tread by a hereinafter described friction block, the latter gradually retarding the rotation of the rollers and consequently slowing down the car wheel as will be understood.

The friction block is designated in general by the numeral 18 and is shown to comprise a plate like back 19 from the opposite longitudinal edges of which extend forwardly a pair of plate like legs 20, which are formed in their front edges with semicircular recesses 21, which form seats for the rollers 15 and which frictionally engage the confronting end portions of the rollers when the brake shoe is applied. The friction block slides bodily forwardly and rearwardly between the side plates 12, and to accomplish this elongated horizontally arranged slots 22 are formed in the legs of the block and slidingly receive the spacing bolts of the side plates. It is now clear that the block may be slid forwardly between the side plates until the bolts abut those ends of the slots adjacent to the back of the block in which position the seats in the legs frictionally engage the rollers and lock the rollers against movement. The block may be slid rearwardly between the side plates until the bolts abut the opposite ends of the slots in which position of the parts the seats will be entirely disengaged from the rollers and the latter will be free to turn, and this is the normal or released position of the block.

For actuating the friction block, a pair of strap eyes 23 are formed on the rear face of the back, and a U-shaped stiff leaf spring 24 is provided with hooked terminals 25 which engage through these eyes, the bridge portion 26 of the spring being fixedly secured in any preferred manner to the brake beam 11, the connection here shown being bolts 27 passed horizontally through the spring and brake beam. Now as the brake beam 11 is moved in the direction of the car wheel, the leaf spring will operate in the nature of a resilient link to force the friction block bodily forward and into engagement with the rollers as shown in Fig. 3, and when the brake beam is moved in the opposite direction the spring will move the friction block away from the rollers 15 as shown in dotted lines in this view.

It will be noted that when in set position as shown in Fig. 3, the legs of the friction block engage the end portions of the friction rollers and force the friction rollers into frictional engagement with the car wheel tread without straining the gudgeons of the rollers as would be the case were the friction block dispensed with and the side plates which carry the rollers actuated bodily toward and away from the car wheel.

By now referring to Fig. 5 it will be seen that the central portion of each friction roller is serrated as shown at 28, this serrated portion forming a roughened wear band for engagement with the wheel tread so that a more positive binding of the roller against the wheel tread is assured than were the roller smooth throughout its entirety. The spring 24 will yield slightly when the brake mechanism on the railway coach is set so that the shock of the friction rollers impinging against the car wheel tread will not be entirely transmitted to the brake beam, and it will be further noted that when the shoe is in applied position that as the car wheel passes over obstructions such as rail joints, switch points and the like, that the spring will also yield and will not transmit the jar to the brake beam, thus promoting the long life of both brake shoe and brake beam.

What is claimed, is:—

1. A brake mechanism including spaced side plates, a roller revolubly mounted between said plates, and adapted for frictional engagement with a wheel, a block slidable bodily between said plates and having spaced legs straddling said roller and engaging the end portions thereof adjacent to said side plates, and means for securing said block to an actuating lever.

2. A brake mechanism including spaced side plates, a roller revolubly mounted between said side plates and adapted for frictional engagement with a wheel, a friction block movable bodily between said plates and having portions adapted to receive and frictionally engage said roller, and a spring link assembled with said block and adapted for connection to an actuating lever.

3. A brake shoe including spaced side plates adapted to extend along opposite sides of a wheel, transverse elements fixedly securing said plates in spaced relation, a plurality of superposed rollers mounted between said plates and adapted for frictional engagement with the wheel, a friction block straddling said rollers and having slots loosely receiving said transverse elements and permitting of the block sliding bodily between said plates, said block having recesses receiving said rollers, the walls of said recesses frictionally engaging said rollers and retarding movement thereof when the block is in a certain position of its sliding movement, and a curvilinear spring terminally connected to said block and having a bridge portion adapted for engagement with a brake beam, said spring serving as a yielding link for moving said block bodily between said plates.

In testimony whereof, I affix my signature, in presence of two witnesses.

WILLIAM S. THOMAS.

Witnesses:
PHILIP F. LARNER,
E. IRVIN BURNS.

Copies of this patent may be obtained for five cents each, by addressing the "Commissioner of Patents, Washington, D. C."